(12) United States Patent
Willis

(10) Patent No.: US 8,136,329 B2
(45) Date of Patent: Mar. 20, 2012

(54) TOWER STRUCTURE AND METHOD OF ASSEMBLING

(76) Inventor: Jeffrey O. Willis, Blair, NE (US)

( * ) Notice: Subject to any disclaimer, the term of this patent is extended or adjusted under 35 U.S.C. 154(b) by 482 days.

(21) Appl. No.: 12/247,551

(22) Filed: Oct. 8, 2008

(65) Prior Publication Data

US 2009/0090069 A1 Apr. 9, 2009

Related U.S. Application Data

(60) Provisional application No. 60/978,691, filed on Oct. 9, 2007.

(51) Int. Cl.
*E04C 3/00* (2006.01)
*E04H 12/00* (2006.01)
*E04B 1/00* (2006.01)
(52) U.S. Cl. ........... 52/848; 52/836; 52/849; 52/651.01; 52/745.17; 52/745.18
(58) Field of Classification Search ............... 52/651.01, 52/745.17, 745.18, 836, 848, 849
See application file for complete search history.

(56) References Cited

U.S. PATENT DOCUMENTS

| | | | |
|---|---|---|---|
| 3,196,990 A | 7/1965 | Handley | |
| 3,217,459 A | 11/1965 | Meyer | |
| 3,276,182 A | 10/1966 | Handley | |
| 3,360,288 A | 12/1967 | Holscher | |
| 3,728,837 A | 4/1973 | Kiefer, Jr. | |
| 4,248,025 A | 2/1981 | Kleine et al. | |
| 4,272,929 A | 6/1981 | Hanson | |
| 4,906,150 A | 3/1990 | Bennett | |
| 4,934,114 A | 6/1990 | Lindsey | |
| 5,085,548 A | 2/1992 | Moyles | |
| 5,117,607 A | 6/1992 | Bourdon | |
| 6,157,088 A | 12/2000 | Bendix | |
| 6,173,537 B1 | 1/2001 | Davidsson et al. | |
| 6,278,198 B1 | 8/2001 | Willis et al. | |
| 6,380,909 B1 | 4/2002 | Wilkinson et al. | |

(Continued)

FOREIGN PATENT DOCUMENTS

GB 2203767 10/1988

(Continued)

OTHER PUBLICATIONS

International Search Report and Written Opinion for PCT/US08/79207 dated Dec. 5, 2008 (12 pages).

*Primary Examiner* — Mark Wendell
(74) *Attorney, Agent, or Firm* — Brian B. Diekhoff; Polsinelli Shughart PC

(57) ABSTRACT

A modular tower structure is described herein. The modular tower uses a cost-effective, efficient design that reduces the amount of steel necessary for tower structures for wind turbines. The modular tower is constructed from sections. The sections are constructed from panels. The panels comprise a curved or arcuate shape. The panels include vertical edges and horizontal edges. A vertical connection connects or secures the panels at the vertical edges of the panels and forms the sections. The sections have a generally circular shape. The vertical connection includes an interior vertical friction plate positioned over a seam or gap between adjacent panels and an exterior vertical friction plate positioned over the seam or gap between adjacent panels. A horizontal connection connects or secures the sections at the horizontal edges of the panels. The horizontal connection comprises an interior friction plate that covers a seam or gap between the adjacent sections and an exterior friction plate that covers the seam or gap between the adjacent sections.

41 Claims, 14 Drawing Sheets

U.S. PATENT DOCUMENTS

| | | |
|---|---|---|
| 6,408,575 B1 | 6/2002 | Yoshida et al. |
| 6,470,645 B1 | 10/2002 | Maliszewski et al. |
| 6,505,785 B2 | 1/2003 | Willis et al. |
| 6,522,025 B2 | 2/2003 | Willis et al. |
| 6,532,700 B1 | 3/2003 | Maliszewski et al. |
| 6,557,312 B2 | 5/2003 | McGinnis |
| 6,755,407 B1 | 6/2004 | Olson et al. |
| 6,907,706 B1 | 6/2005 | Schippmann et al. |
| 6,957,518 B1 | 10/2005 | Koch, Jr. |
| 7,114,295 B2 | 10/2006 | Wobben |
| 7,160,085 B2 | 1/2007 | de Roest |
| 2003/0147753 A1 | 8/2003 | Ollgaard |
| 2006/0272244 A1 | 12/2006 | Jensen |

FOREIGN PATENT DOCUMENTS

| | | |
|---|---|---|
| WO | WO03069099 A1 | 8/2003 |
| WO | WO2006050723 A1 | 5/2006 |

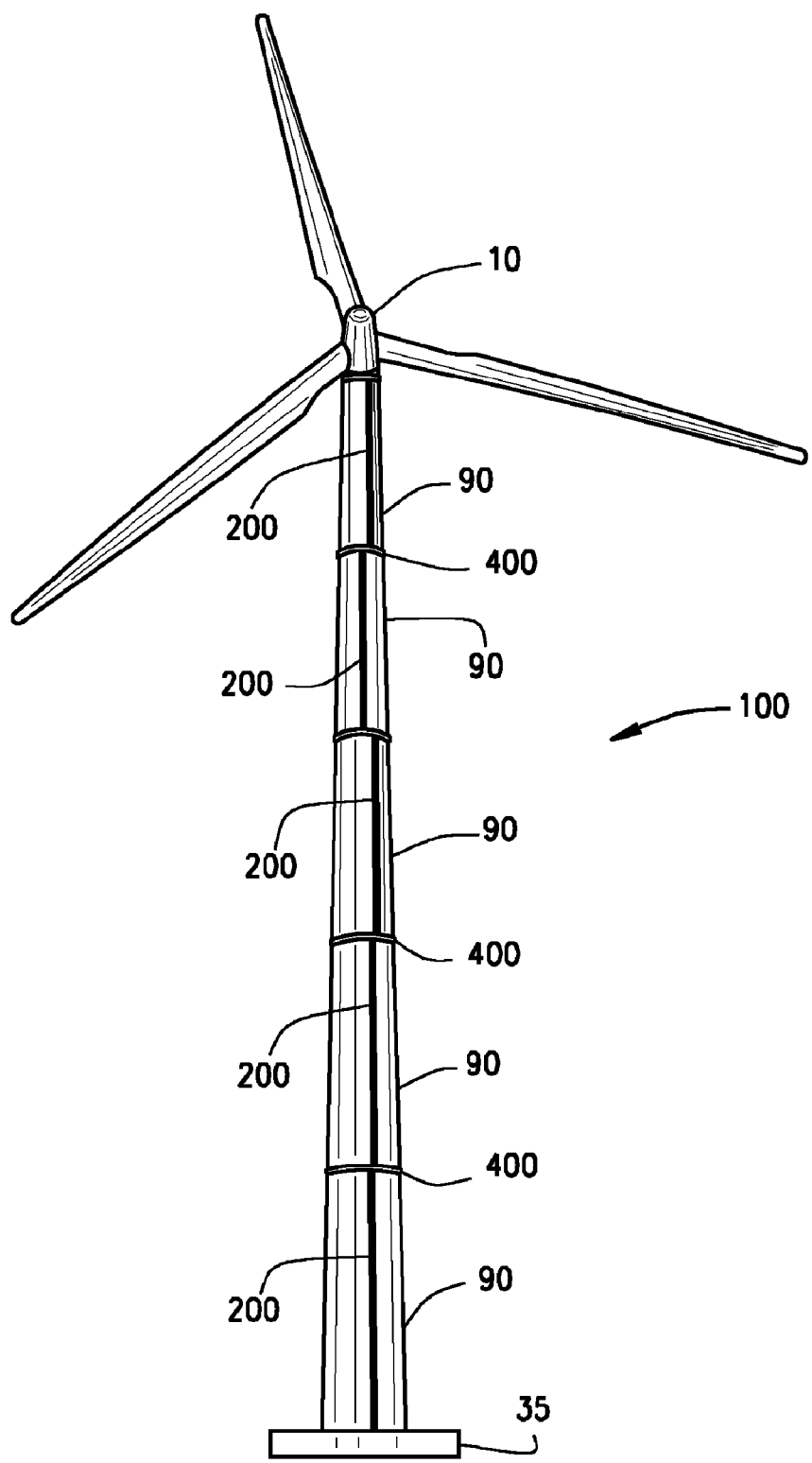
F I G . 1

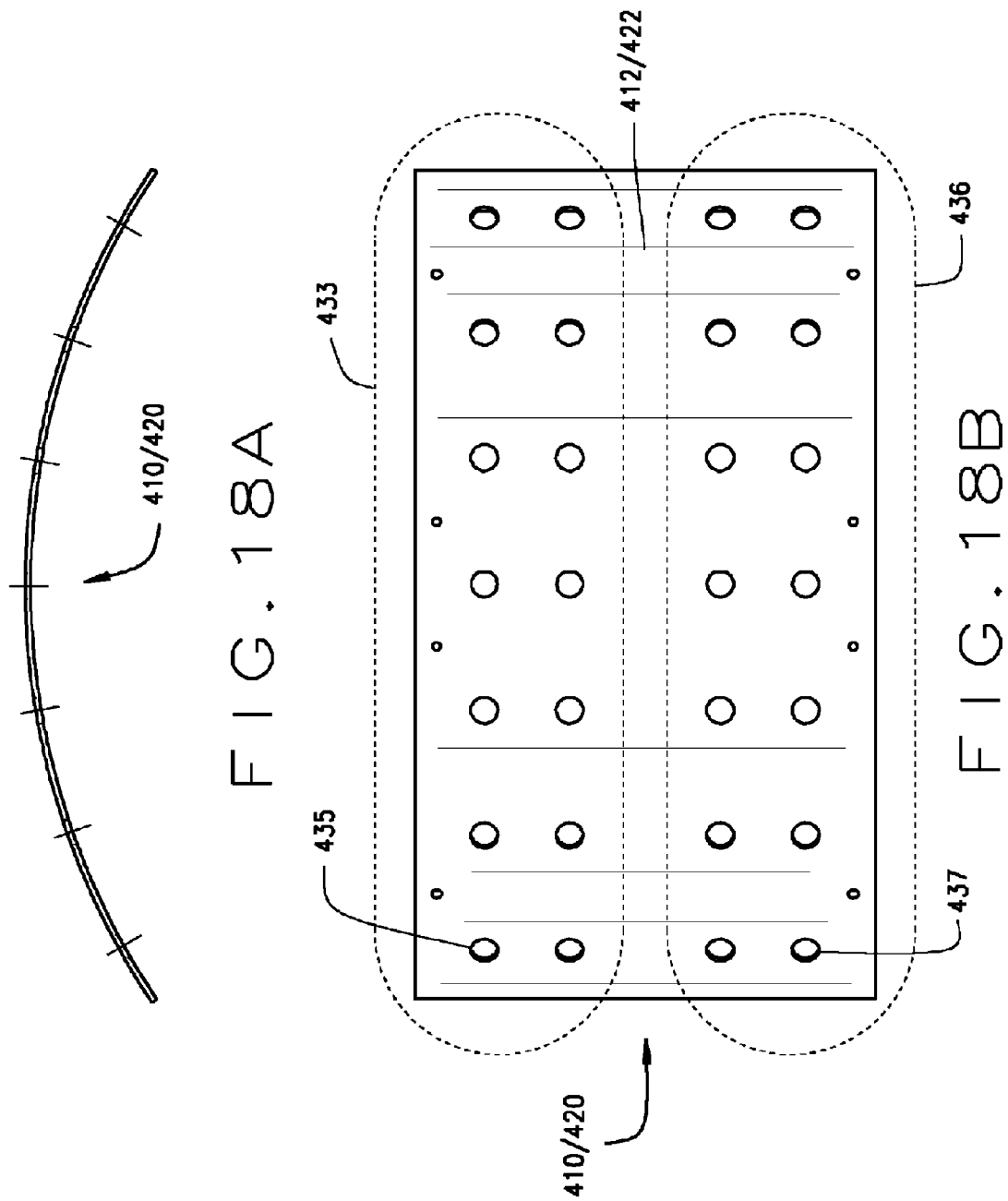

TOWER STRUCTURE AND METHOD OF ASSEMBLING

REFERENCE TO RELATED APPLICATION

This application claims priority to U.S. provisional patent application Ser. No. 60/978,691, filed on Oct. 9, 2007 and is herein incorporated by reference in its entirety.

FIELD OF INVENTION

The present invention relates to a modular tower and a method of constructing the modular tower.

BACKGROUND OF INVENTION

Prior attempts in constructing modular towers have used flange connections or load-bearing bolts to hold portions of the tower together, however, the flange connections and the load-bearing bolts suffer from fatigue and may fail. Towers for wind turbines are subjected to near constant forces from the revolution of the turbine, which may break down the flange connections or load-bearing bolt connections. Further, the flange connections on large welded pieces are expensive and difficult to manufacture. The manufacturing tolerances for the flange connections are difficult to satisfy and result in limited commercial availability.

Other prior attempts in constructing towers have involved the use of lattice towers made from metal. However, such lattice towers suffer from numerous drawbacks, including significant labor cost for installation and maintenance of the tower. The lattice towers also require an excessive area of space for the base or ground-contacting portion of the lattice tower. The lattice towers also have a tendency to attract birds and other wildlife, as the lattice towers have a generally open construction, which provides habitat for the birds and animals. Further, the lattice towers do not provide a closed working space for technicians. The lattice towers also require ongoing maintenance in checking the tightness of the bolts that are used in the construction of the lattice tower.

Other towers have involved the use of concrete slabs in construction. However, such concrete towers weigh too much to be feasible.

SUMMARY

A modular tower structure is described herein. The modular tower uses a cost-effective, efficient design that reduces the amount of steel necessary for tower structures for wind turbines. The modular tower is constructed from sections. The sections are constructed from panels.

The modular tower structure comprises a plurality of the sections, wherein the sections comprise a plurality of the panels. The panels comprise a curved or arcuate shape. The panels comprise vertical edges and horizontal edges. A vertical connection connects or secures the panels at the vertical edges of the panels and forms the sections. The sections have a generally circular shape. The vertical connection comprises an interior vertical friction plate positioned over a seam between adjacent panels and an exterior vertical friction plate positioned over the seam between adjacent panels. A horizontal connection connects or secures the sections at the horizontal edges of the panels. The horizontal connection comprises an interior friction plate that covers a seam between the adjacent sections and an exterior friction plate that covers the seam between the adjacent sections.

The modular tower and a method of constructing the modular tower described herein provide many advantages. The modular tower may be assembled and maintained from the inside of the tower structure. As such, the technician is protected by the tower structure during assembly and maintenance, thus providing a safer work environment. Further, exterior ladders or other mechanical lift equipment are not required for maintenance. The components of the modular tower are less expensive and less complicated to manufacture and/or procure. The tolerances needed for the components are easier to satisfy. The sizes of the components of the modular tower reduce transportation costs, as standard over-the-road trucks may be used without the need for escorts or special permits. The design of the modular tower provides better fatigue characteristics providing for a more efficient use of steel and other metals. As the fatigue characteristics are improved compared to conventional towers, less steel and metal may be used in the design of the modular towers described herein. The less steel and metal required by the modular tower designs described herein results in a cost savings as compared to conventional towers.

BRIEF DESCRIPTION OF DRAWINGS

FIG. 1 is a view of the modular tower structure.

FIG. 18(a) shows a side view of the friction plate for the horizontal connection.

FIG. 18(b) shows a top view of the friction plate for the horizontal connection.

DETAILED DESCRIPTION OF PREFERRED EMBODIMENTS

Figure 2:
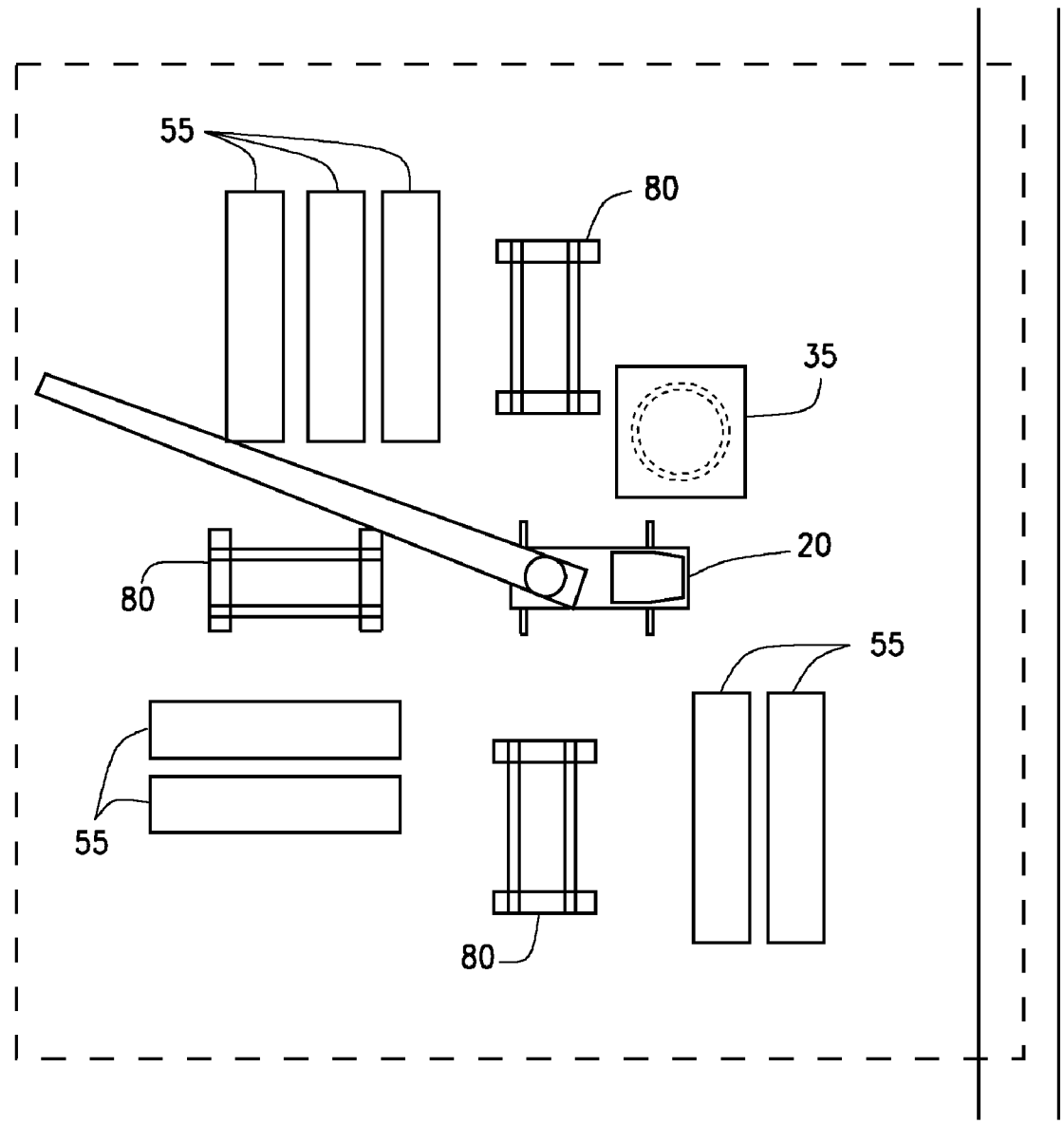
FIG. 2 is a plan view of the assembly site for the modular tower.
Figure 3:
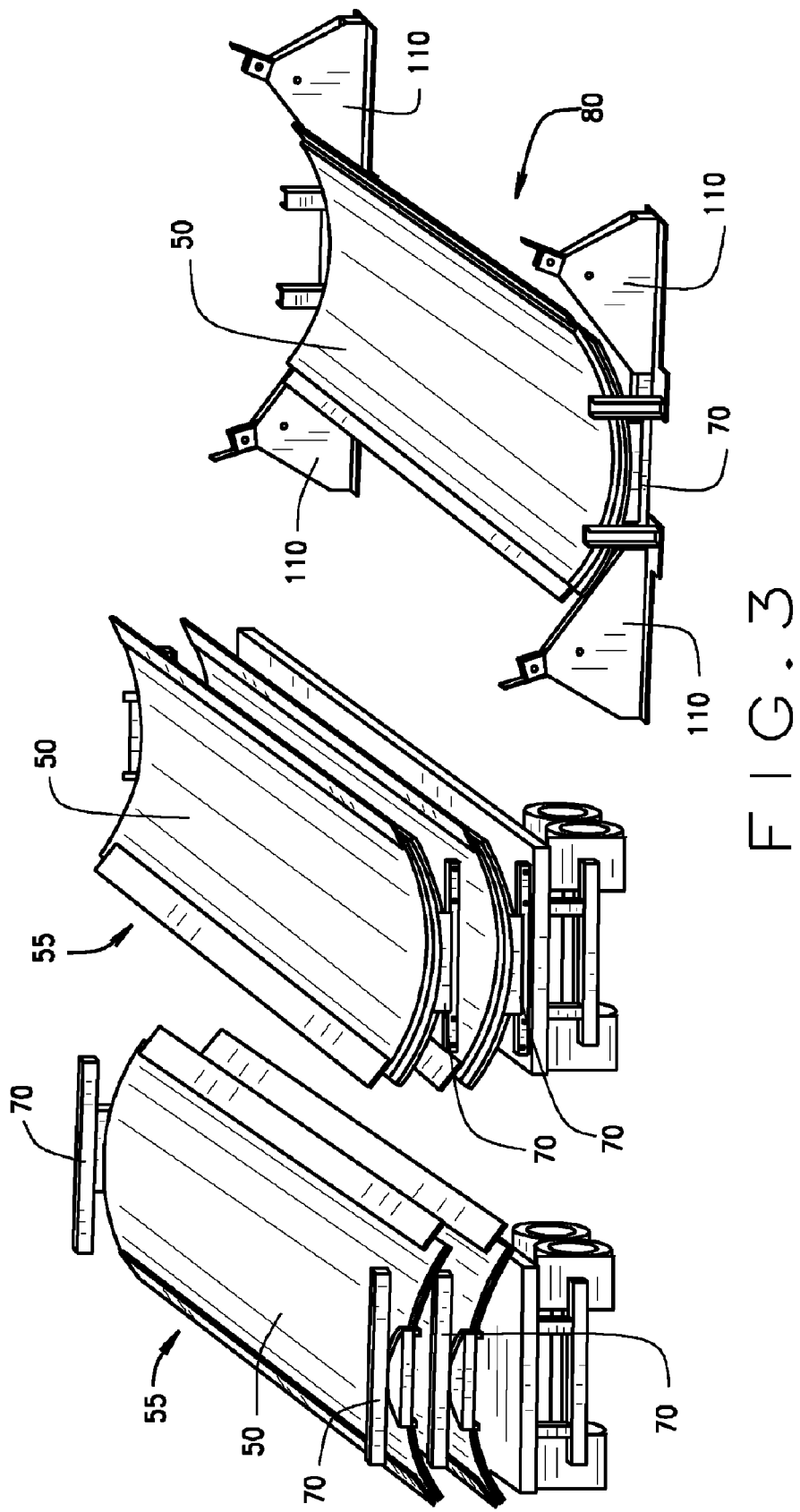
FIGS. 3-9 show the delivery of the panels and the assembly of one of the sections.
Figure 4:
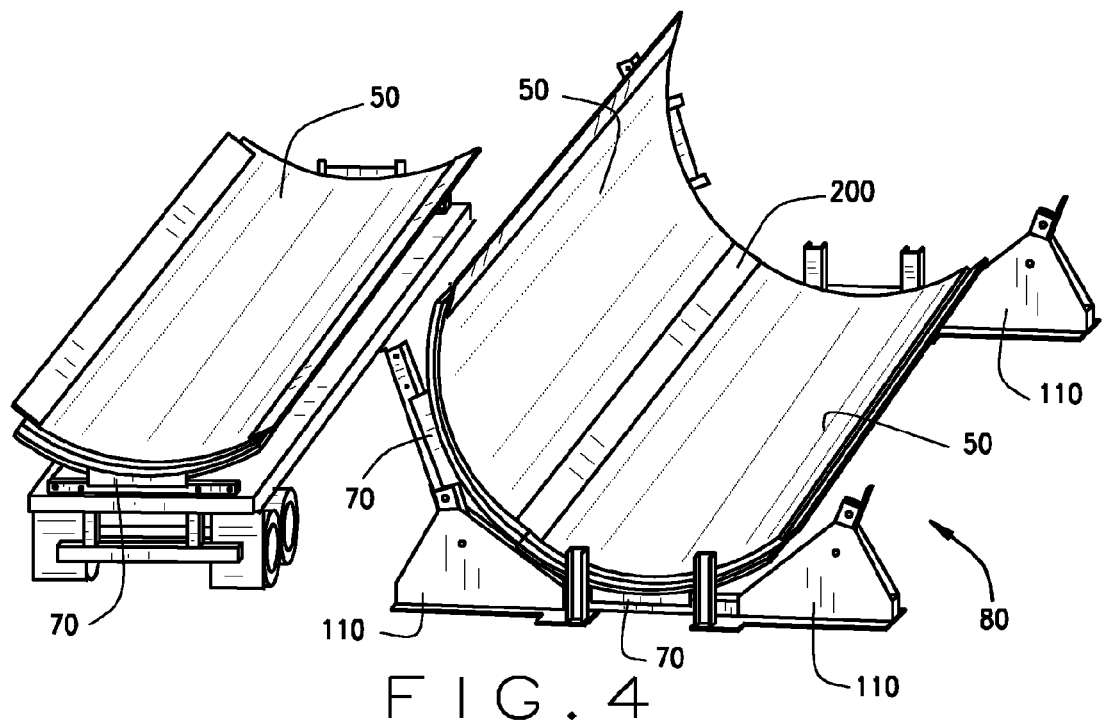
Figure 5:
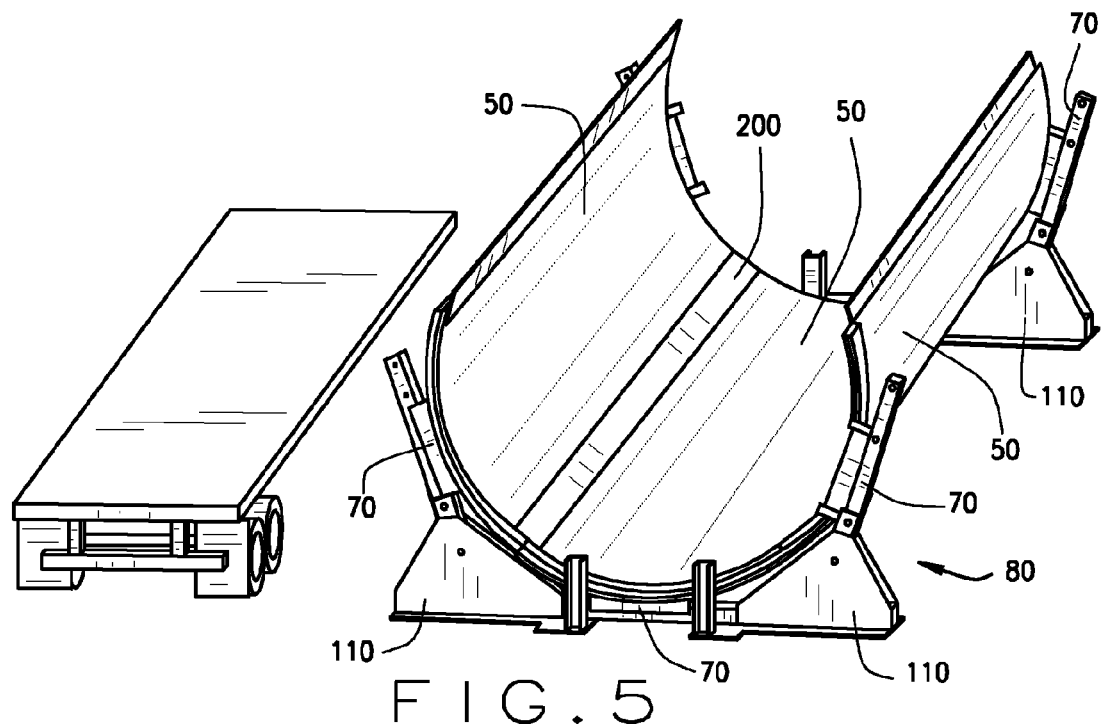
Figure 6:
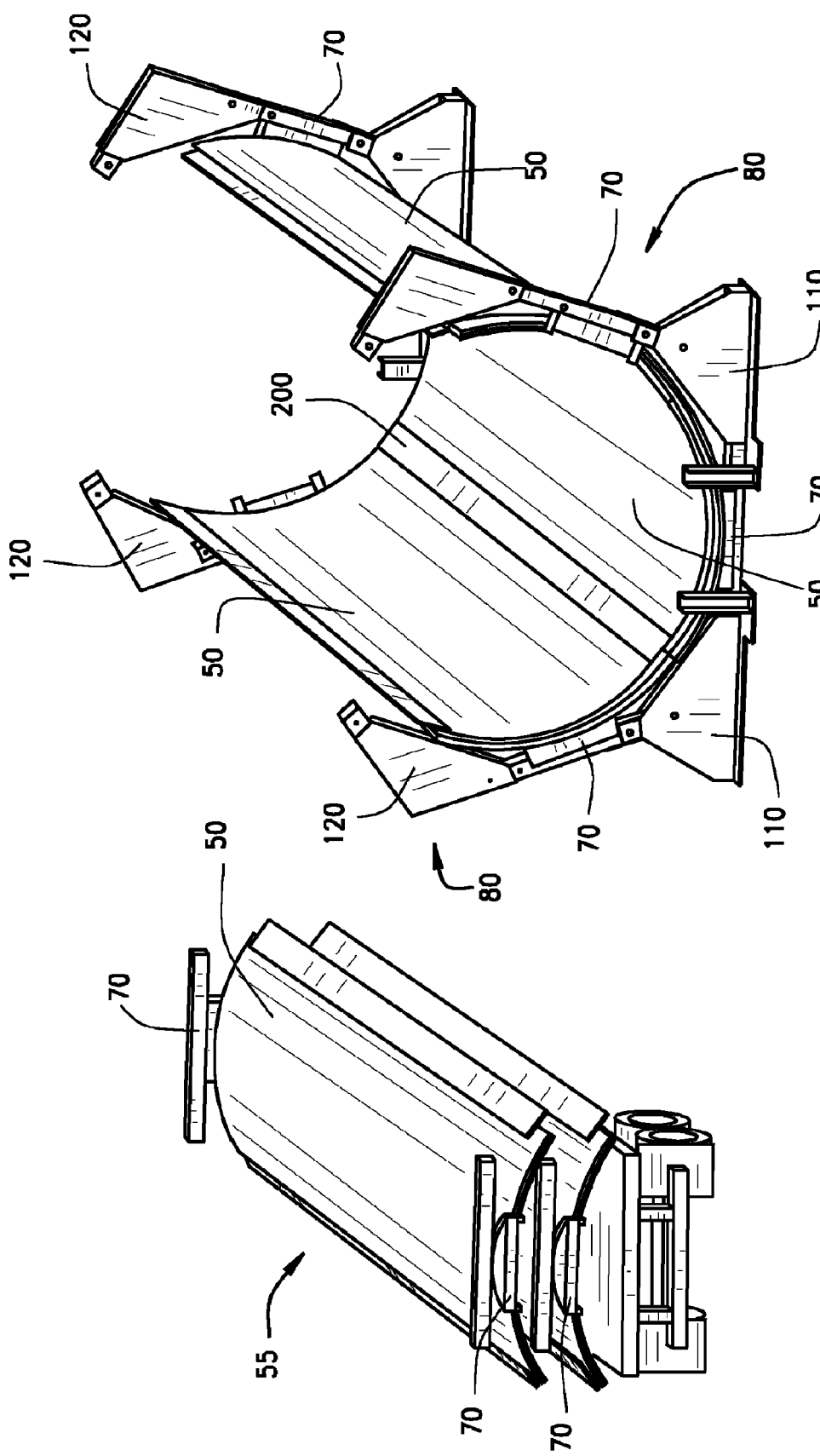
Figure 7:
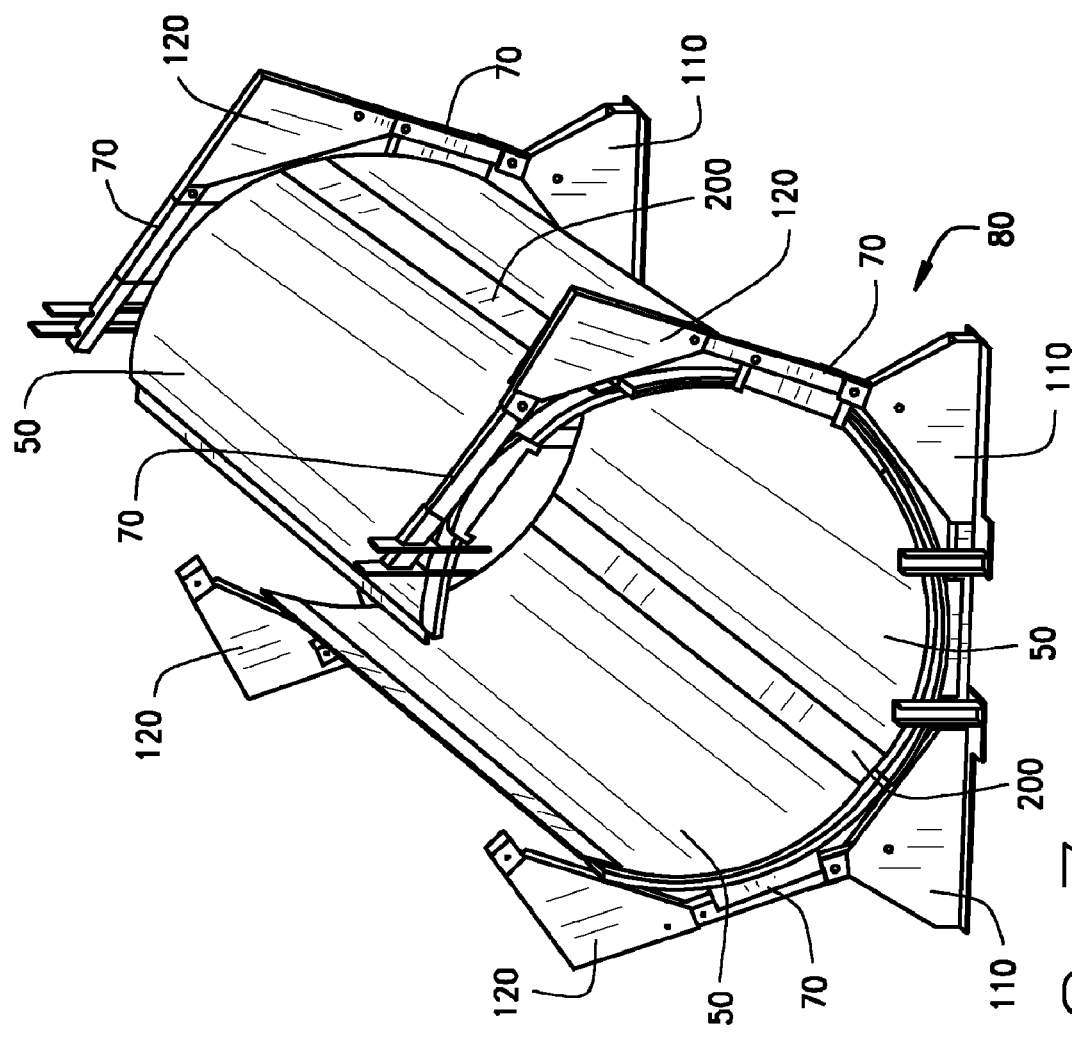
Figure 7:
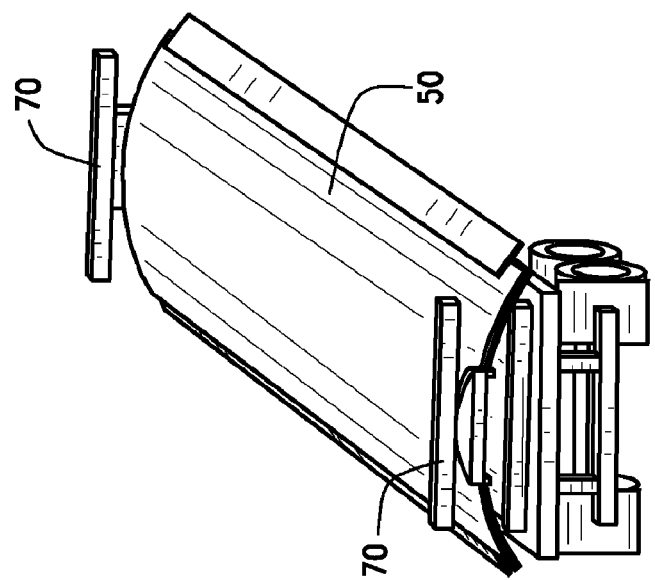
Figure 8:
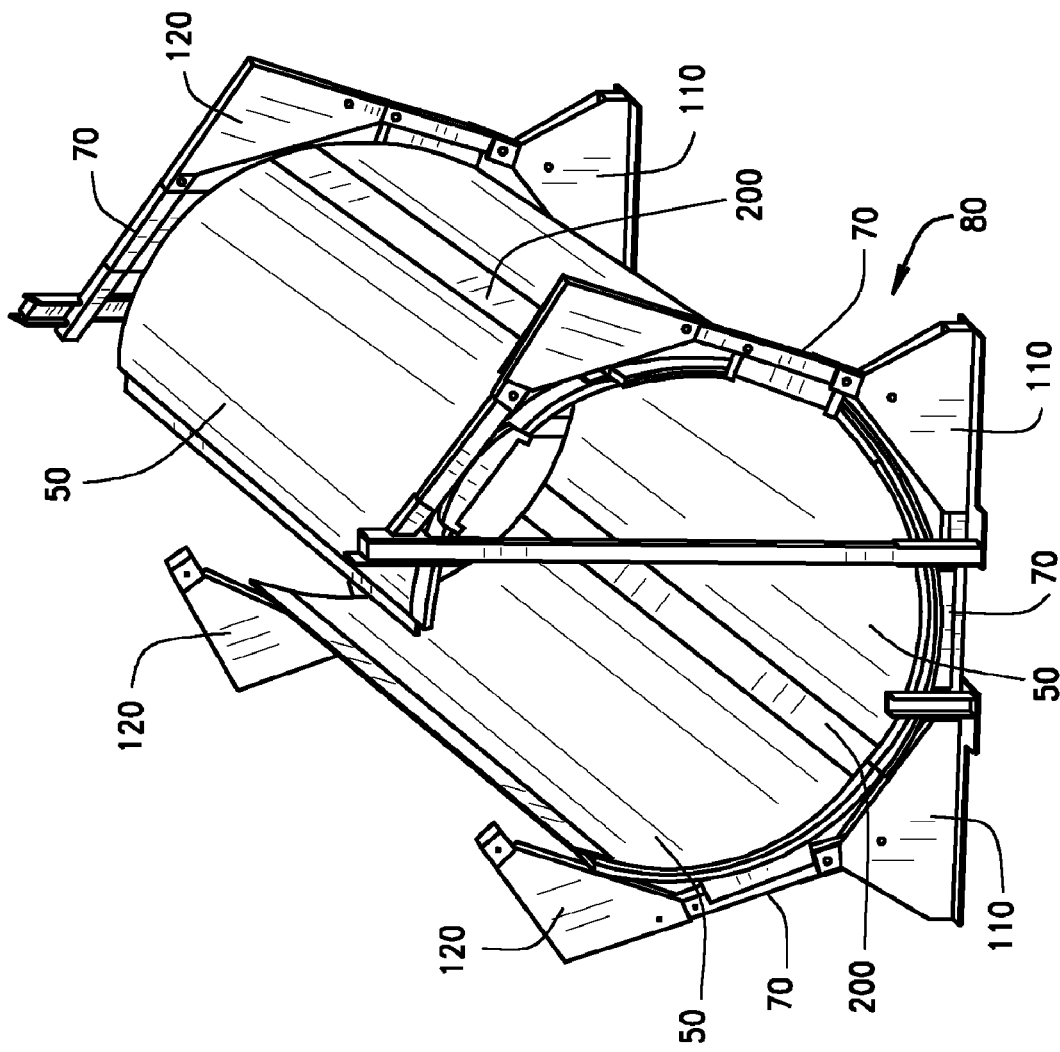
Figure 8:
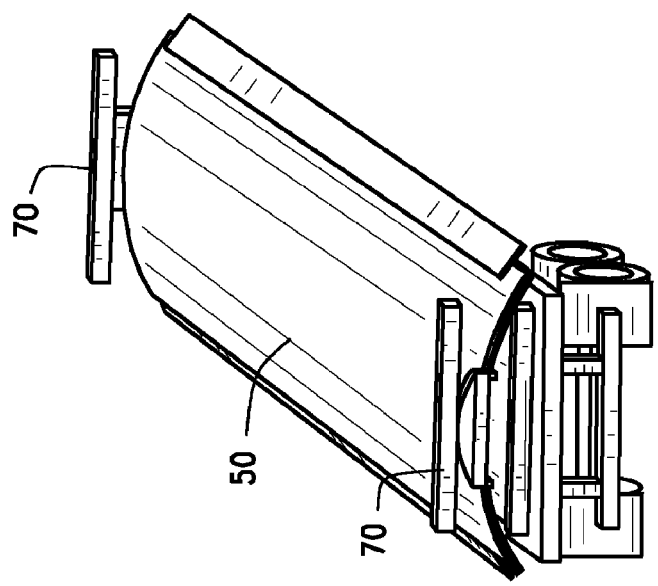

Herein is described a modular tower structure and method of assembling the modular tower structure. The modular tower structure comprises a plurality of panels that are assembled into a plurality of sections at the construction or assembly site to form the tower structure. A vertical connection between the panels secures or connects the panels together in order to form each section. The sections are stacked upon each other and fastened or secured together to form the modular tower. A horizontal connection between the sections fastens or connects the sections together.

The towers may be used to support wind turbines for the generation of electricity. Two to five megawatt turbines or other turbines may be positioned on the tower structure. Although the towers are well suited to support the wind turbines, the modular tower structure may be used for other purposes, such as, for example, supporting communications equipment, electrical utility lines, etc.

The panels typically are made of a mild steel or other metal alloy. Grade 50 steel is one suitable steel for use in the panels. The panels generally have a curved or arcuate shape such that a plurality of the panels may be joined to form the section. The sections have a generally circular outer diameter. Additional panels are further joined to form additional sections which are stacked and fastened or secured onto a first section. A plurality of the sections are used to form the modular tower structure.

The panels may be transported to the jobsite via conventional over-the-road trucks. Preferably, the panels do not have a width greater than approximately 12 feet such that conventional over-the-road trucking may be used to deliver the panels to the jobsite without the need for escorts. As standard over-the-road trucking transportation may be utilized to deliver the panels to the jobsite, a significant savings in transportation costs is realized by the use of the modular tower structure and methods described herein, as compared to other towers which require the use of specialized trucks, escorts for the trucks, and special permitting for transportation.

The modular tower structure described herein provides for a cost effective tower that exceeds current typical building heights of 80 meters. The modular tower structure may operate above the 80 meter level. Generally, the higher the turbine is positioned on top of the tower, the more wind there is available for electrical generation at the turbine. At the higher elevations, there is less turbulence as the turbulent effects of the ground on the wind are lessened. Wind turbines may operate more efficiently and with greater output at these higher elevations. The use of the higher towers will allow wind powered electricity to be used in more places not currently economically feasible for the generation of wind powered electricity with conventional tower structures. The modular tower described herein satisfies the demand by wind turbine manufacturers for cost-effective towers for large turbines (2 megawatts and above) that current tower designs do not meet.

The modular tower and the method of constructing the modular tower will now be described with reference to the figures. A fully assembled modular tower 100 is shown in FIG. 1. The modular tower 100 is shown supporting a wind turbine 10. A plan view of the assembly site for the modular tower 100 is shown in FIG. 2. The assembly process of the modular tower 100 is shown in FIGS. 3-9.

A truck arrives at the construction site carrying one or more panels 50. The panels 50 include frame members 70 that were previously attached to the panels 50 at the factory or other assembly/distribution center. The frame members 70 are attached to an exterior surface of the panels 50.

The panels 50 are provided in shipping bundles 55 to ease in loading, transportation, unloading, and assembly. The shipping bundles 55 comprise two or more panels 50. The shipping bundles 55 include the panels 50 in a stacked configuration. The frame members 70 assist in the stacking of the panels 50 into the shipping bundles 55. The shipping bundles 55 also provide for two-point loading and unloading.

Figure 9:
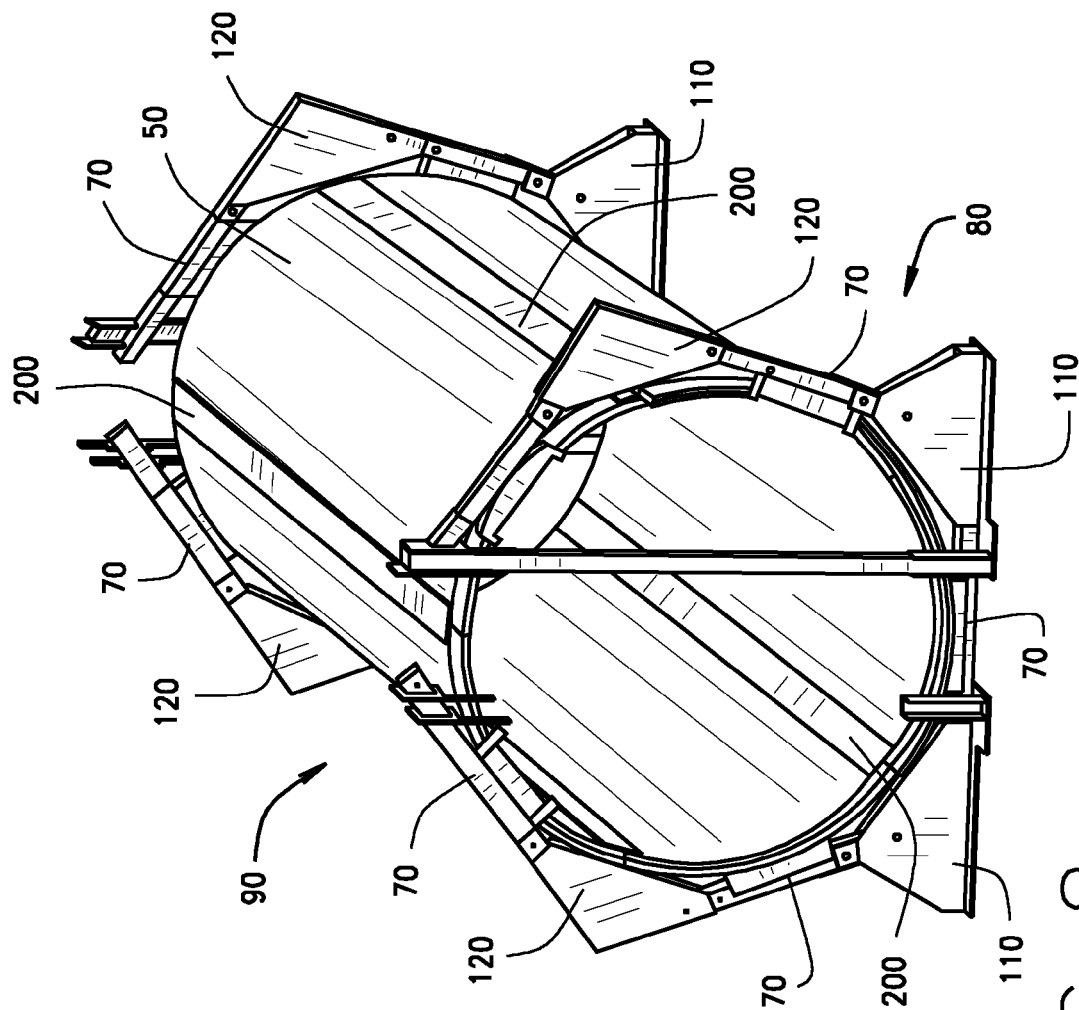
Figure 9:
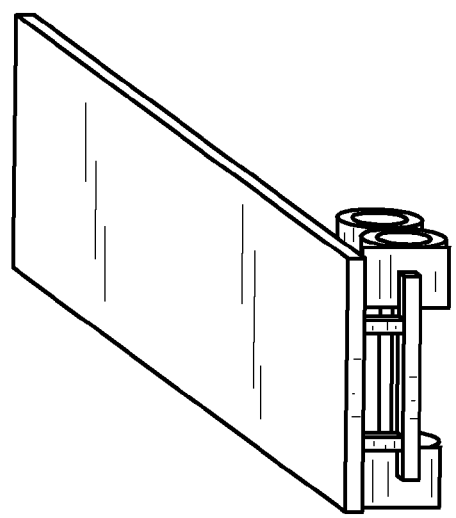

The plan view of the assembly site for the modular tower 100 in FIG. 2 shows the bundles 55. The panels 50 are removed from the bundles 55 by a crane 20. The crane 20 positions the panels 50 into a partially constructed field assembly jig 80, where the panels 50 are assembled into sections 90. FIG. 9 shows a completed section 90. The crane 20 positions the sections 90 on a foundation 35 for the tower structure 100.

The frame members 70 assist in assembly of the panels 50 into the sections 90. The crane 20 or other lift may grasp the frame member 70 in order to move the panels 50. As such, the crane 20 is not directly touching the panels 50 and damage to the panels 50 during the construction and assembly of the sections 90 may be reduced. After construction of the sections 90, the frame members 70 are removed from the sections 90 and returned to the factory for re-use on other panels 50.

The panels 50 are positioned in the field assembly jig 80, which provides support for the panels 50 via the frame members 70 as the panels 50 are assembled into the section 90 of the tower structure 100. The field assembly jig 80 includes ground support wings 110. The ground support wings 110 provide support for the base components of the field assembly jig 80. The ground support wings 110 connect or attach to the frame members 70 to assist in positioning the panels 50 as the panels 50 are formed into the section 90. As the panels 50 are assembled on the field assembly jig 80 during the assembly of the section 90, upper support wings 120 are added to the frame members 70 in order to assist in completion of the section 90. The upper support wings 120 further receive another frame member 70 during the formation of the section 90. As such, the frame members 70, the ground support wings 110, and the upper support wings 120 form the jig assembly 80.

The panels 50 are assembled together in the field assembly jig 80 via a vertical connection 200. After the section 90 is completed, the crane lifts the section 90 onto the foundation 35 for the tower structure 100 or onto a previously completed section 90. The plurality of sections 90 are stacked on each other and are fastened or secured together via a horizontal connection 400. The sections 90 generally taper in diameter as the sections 90 build to a top of the tower structure 100.

Figure 10:
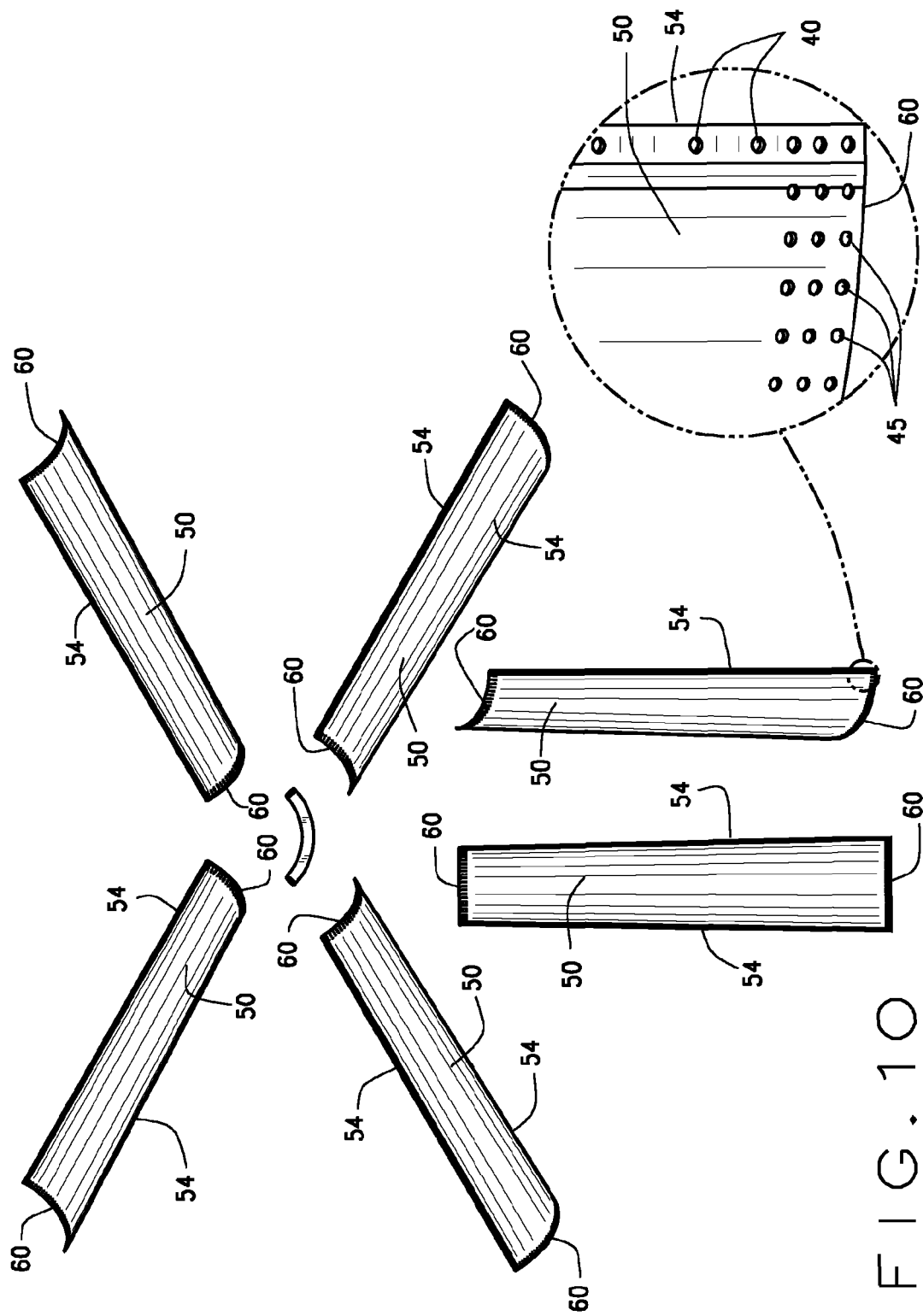
FIG. 10 shows a view of the panel.

The panels 50 generally have a curved or arcuate shape, and, as such, a plurality of the panels 50 form the generally circular section 90. With reference to FIG. 10, the panels 50 have vertical edges 54 that join with the vertical edges 54 of adjacent panels 50 during the assembly of the section 90. The panels 50 have top and bottom horizontal edges 60, that form top and bottom edges of the section 90. As described herein, certain portions of the panels 50 may have a planar section near the vertical edges 54 to facilitate connection to adjacent panels 50.

The panels 50 are up to approximately 50 feet in length with a width of less than approximately 12 feet. The panels 50 may be constructed with longer lengths, if required. For example, approximately 18 to approximately 20 panels 50 may be used in construction of an 80 meter tower structure 100, while approximately 32 to approximately 36 panels 50 may be used in construction of a 100 meter tall tower structure 100. The exact number of panels 50 for any given tower design is dependent upon the specific engineering and manufacturing requirements for individual tower application. For a typical 80 meter tower structure 100, the panels 50 are formed into approximately five sections 90 that are stacked on top of each other and joined to form the tower structure 100, while approximately seven sections 90 are stacked on top of each other and joined to form the 100 meter tower. Additional sections 90, such as eight to twelve sections 90, and additional panels 50 may be utilized to increase the diameter of the tower structure 100 and/or the height of the tower structure 100. Fewer sections 90 and fewer panels 50 may also be utilized in a lower tower structure 100.

The panels 50 have a thickness of approximately ⅜ inches to approximately 1½ inches. The thickness of the panels 50 will vary depending on the intended height of the tower structure 100, as well as the vertical position of the panel 50 in the tower structure 100.

Figure 11:
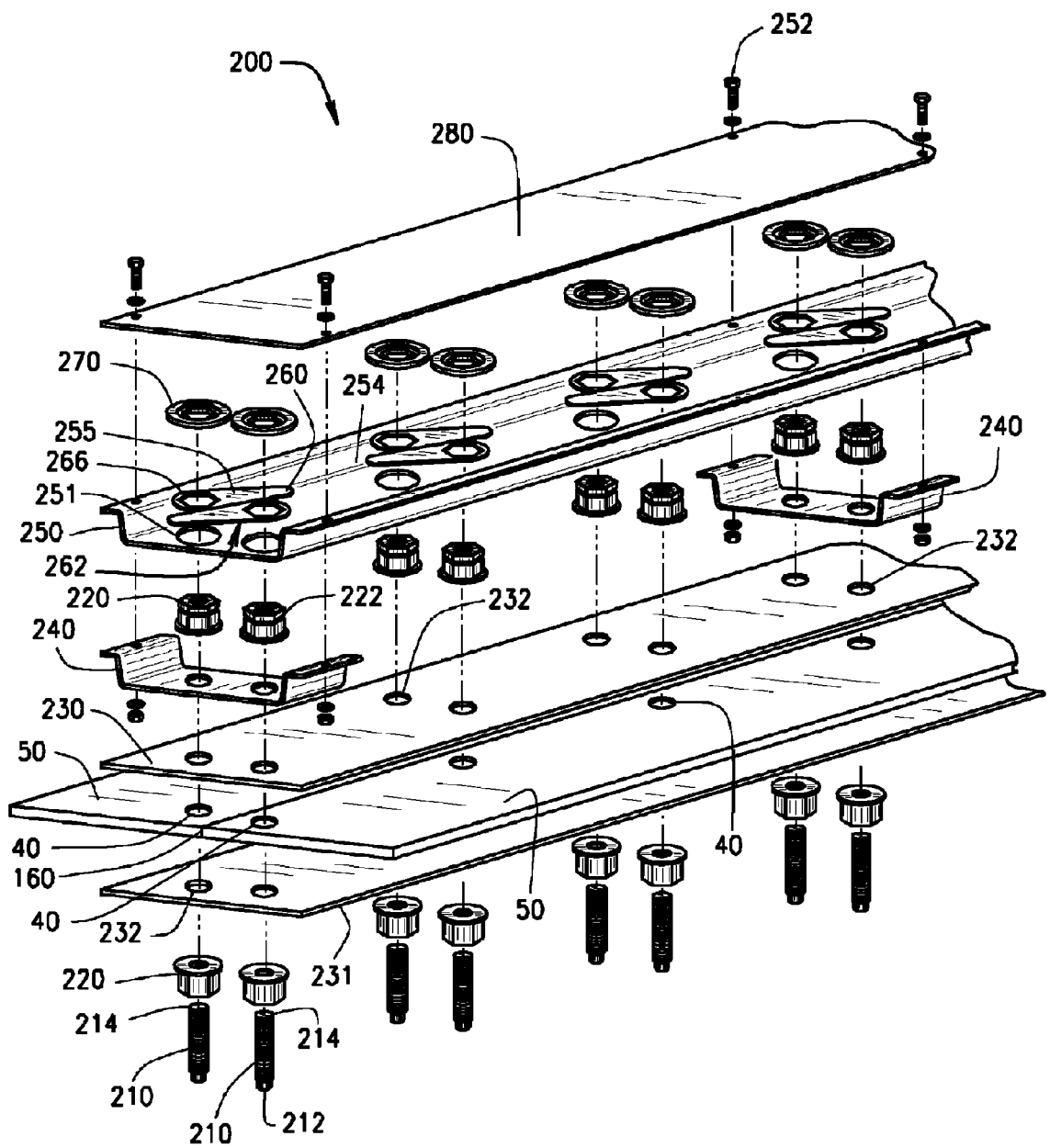
FIG. 11 shows an exploded view of the first embodiment of the vertical connection that connects or secures the panels together.

As the panels 50 are assembled in the field jig assembly 80, the vertical connection 200 secures adjacent panels 50. A first embodiment of the vertical connection is shown in FIG. 11 as the vertical connection 200. The vertical connection 200 covers a seam 160 between the vertical edges 54 of adjacent panels 50 and secures the vertical edges 54 of the adjacent panels 50 in a friction or slip critical connection.

The panels 50 comprise a plurality of holes 40 bored therethrough along the vertical edges 54 of the panels 50. The panels 50 may form a non-curved or planar portion at the vertical edge 50 in order to receive the vertical connection 200. The threaded stud 210 passes through the holes 40 such that a first end 212 of the threaded stud 210 is on the interior side of the panel 50 and a second end 214 of the threaded stud 210 is on the exterior side of the panel 50 on the exterior side of the panel 50. A flange nut 220 receives the threaded stud 210 which has passed through an exterior vertical friction plate 230. The threaded stud 210 receives a flange nut 220 on the interior side of the panel 50 over an interior vertical friction plate 231. The flange nut 220 on the interior side of the panel 50 may be replaced with a conventional heavy hex nut.

The vertical friction plates 230 and 231 comprise a plurality of holes 232 corresponding to the holes 40 in the panel 50 and are installed on the threaded studs 210 on both the interior and the exterior sides of the panel 50. On the interior side of the panel 50, the flange nut 220 or heavy hex nut is securely tightened to the threaded stud 210 on top of the interior vertical friction plate 231. On both the interior and exterior sides of the panel 50, the vertical friction plates 230 and 231 are positioned over the seam 160 between the adjacent panels 50. The vertical friction plates 230 and 231 cover the seam 160. Next, on the exterior side of the panel 50, a support plate 240 is placed over the threaded studs 210. Next, a tray plate 250 comprising a plurality of openings 251 that accept the flange nuts 220 is placed on the support plate 240. The base plate 250 is secured to the support plate 240 via screws 252.

Anti-rotation nut tabs 255 are placed over the flange nuts 220 on the exterior side of the panel 50. The anti-rotation nut tabs 255 prevent the tightened flange nuts 220 from turning during assembly as an extending end 260 of the anti-rotation nut tab 255 contacts an adjacent flange nut 220. The anti-rotation nut tabs 255 include an opening 266 that fits over or engages the flange nuts 220. A bottom surface 262 of the anti-rotation nut tab 255 is supported against a top surface 254 of the tray plate 250. The flange nut 220 may be provided with a groove 222 that receives a snap ring 270. The snap ring 270 may comprise a plastic washer or other snap fitting that urges or holds the anti-rotation nut tab 255 onto the flange nut 220.

A cover plate 280 is attached to the tray plate 250 via screws 252 or other fasteners. The cover plate 280 provides the flange nuts 220 and anti-rotation nut tabs 255 with protection from the elements. The cover plate 280 further provides improved aesthetic appearance to the completed tower structure 100. The cover plate 280 is not required for the for functionality of the vertical connection 200.

The vertical connection 200 extends over most of or the entire length of the seam 160 between adjacent panels 50. During installation, the exterior portions of the vertical connection 200 may be partially installed on several of the panels 50, while the internal portions of the vertical connection 200 may be installed on other panels 50. Certain panels 50 may receive the external portions of the vertical connection 200 on both of their vertical edges 54. As such, much of the assembly labor is conventionally and economically performed at the factory.

Figure 12:
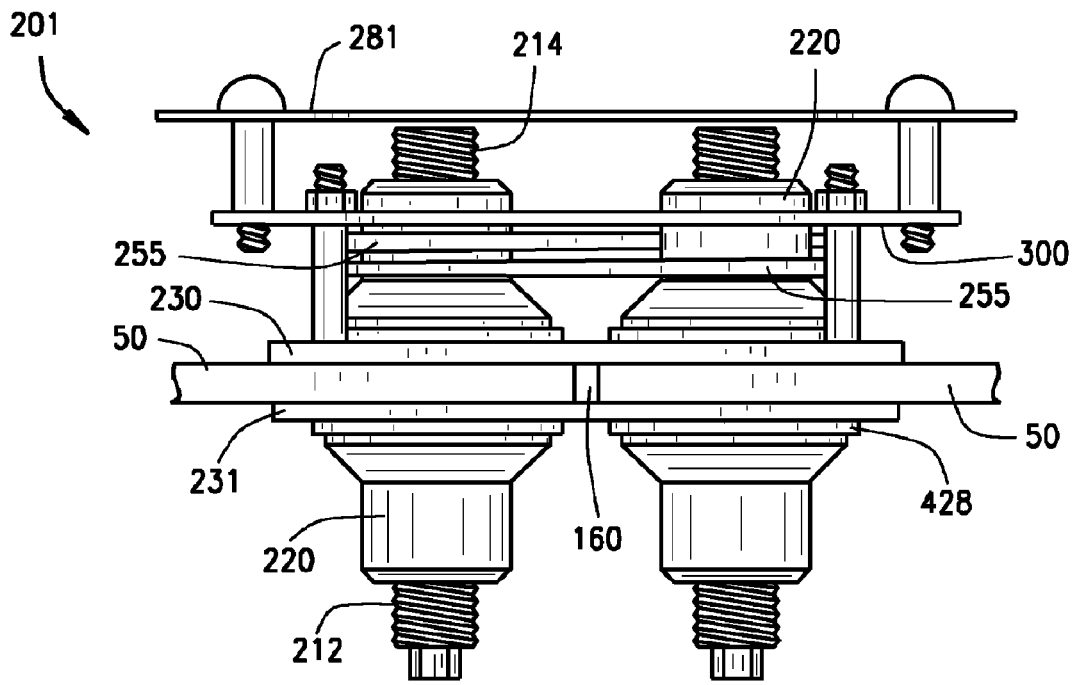
FIG. 12 shows a sectional view of the second embodiment of the vertical connection that connects or secures the panels together.
Figure 13:
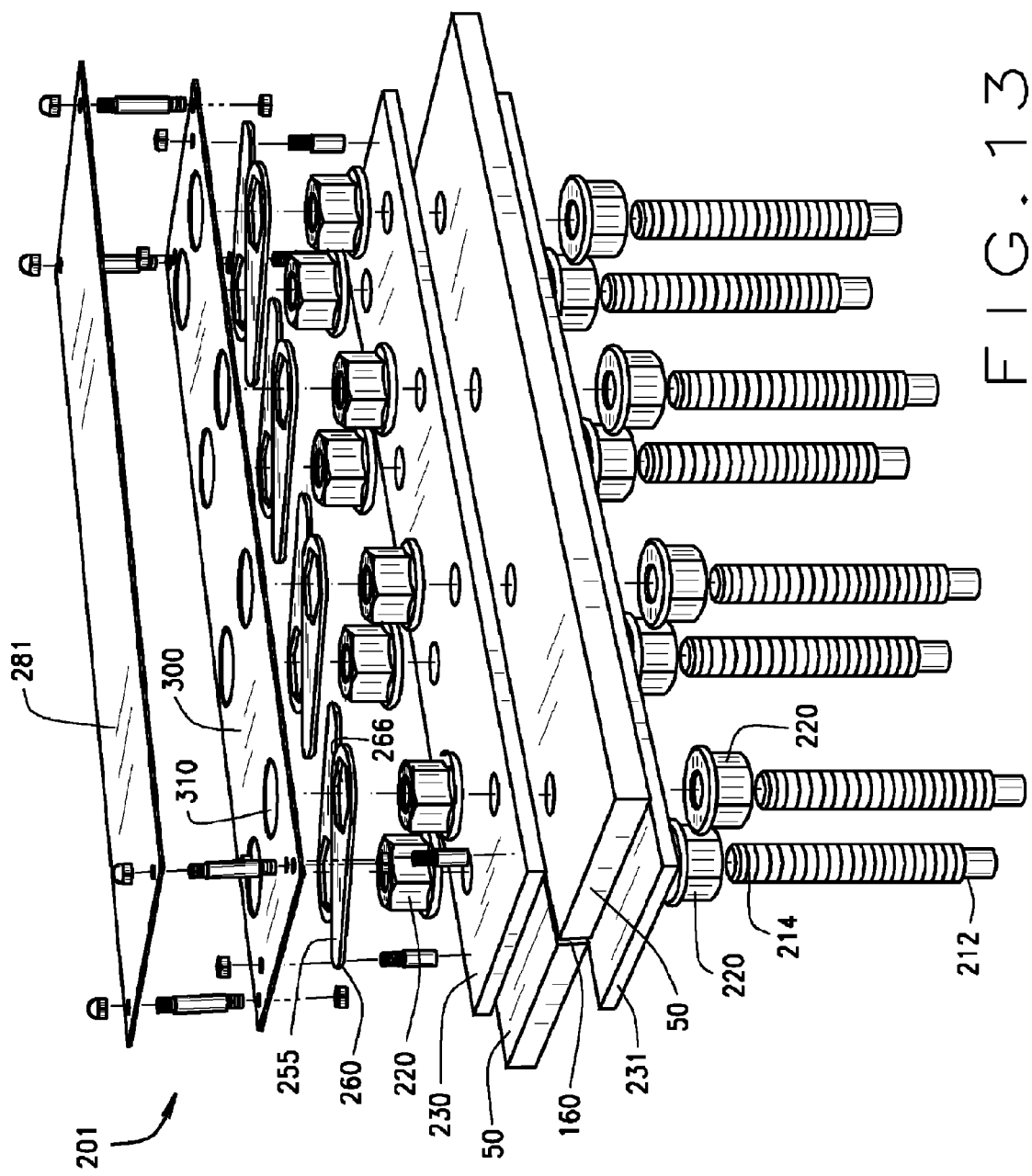
FIG. 13 shows an exploded view of the second embodiment of the vertical connection that connects or secures the panels together.

Another embodiment of the vertical connection is shown in FIGS. 12 and 13 as a vertical connection 201. The vertical connection 201 also forms a slip critical or friction connection between the adjacent panels 50.

The vertical connection 201 utilizes a stop plate 300. The stop plate 300 comprises a plurality of openings 310 that fit over or engage the flange nuts 220 on the exterior side of the panel 50 and secure the flange nuts 220 from rotating. Similar to the vertical connection 200, the interior friction plate 231 and the exterior friction plate 230 covers the seam 160 between the panels 50. The anti-rotation nut tabs 255 are positioned on the flange nuts 220 between the exterior friction plate 230 and the stop plate 300. The stop plate 300 and the exterior friction plate 230 prevent the anti-rotation tabs 255 from falling from the vertical connection 201 during assembly. A cover plate 281 is attached to the stop plate 300.

Figure 14:
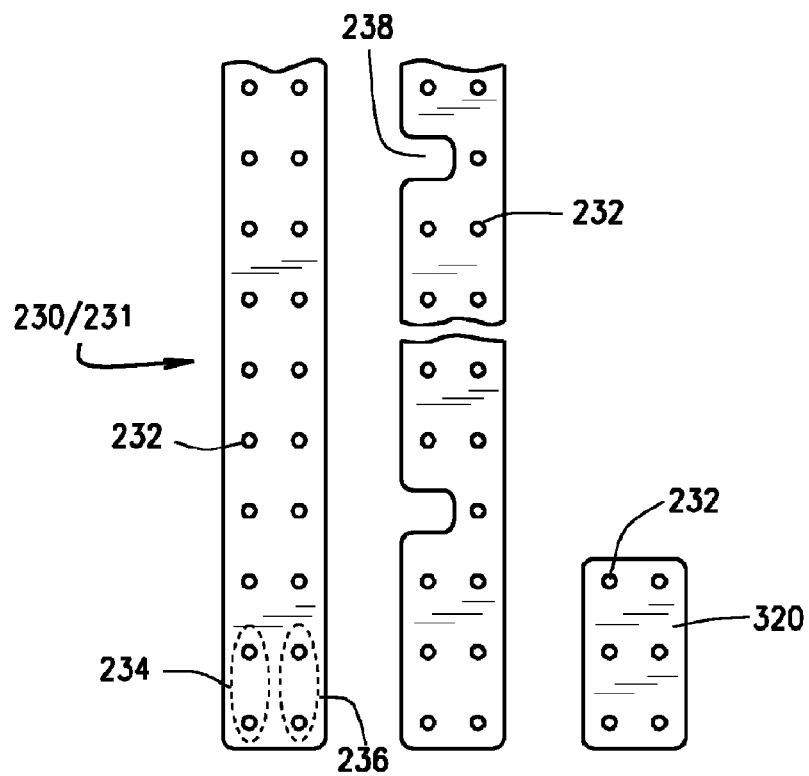
FIG. 14 shows the exterior and interior vertical friction plates.

The interior and exterior vertical friction plates 231 and 230 are shown in FIG. 14. The vertical friction plates 230 and 231 provide a linear member that covers the seam 160. The vertical friction plates 230 and 231 are made of steel or other rigid metal or metal alloy. The vertical friction plates 230 include a plurality of holes 232 that are oppositely disposed such that a first set 234 of the oppositely disposed holes 232 are used to connect to a first panel 50 and a second set 236 of the oppositely disposed holes 232 are used to connect to a second panel 50. The holes 232 correspond to the holes 40 in the vertical edge 54 of the panels 50. In the embodiment shown, the first set of holes 234 form a column of holes 232 opposite a column of holes 232 of the second set 236.

Certain sections of the vertical friction plates 230 and 231 are provided with a cutout area 238 that allows the vertical friction plates 230 to fit over pre-installed studs 210. The cutout areas 238 are filled with a washer tab 239. Further, a saddle plate 320 is placed over the exterior friction plate 230 in the vicinity of the cutout areas 238 to provide needed support.

Figure 15:
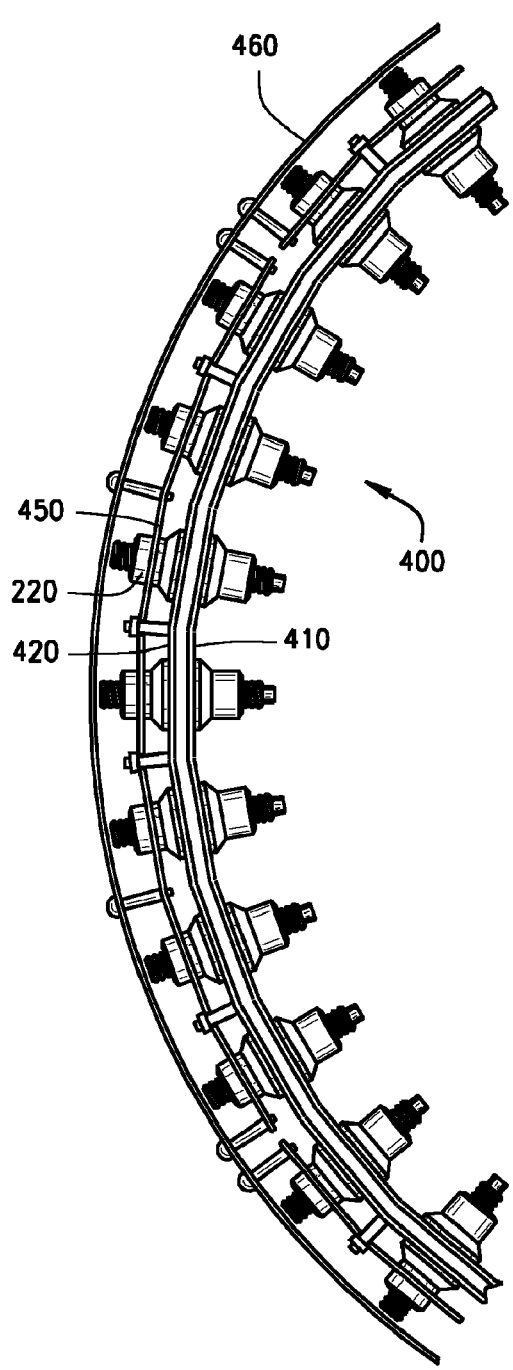
FIG. 15 shows a top down view of the horizontal connection.
Figure 16:
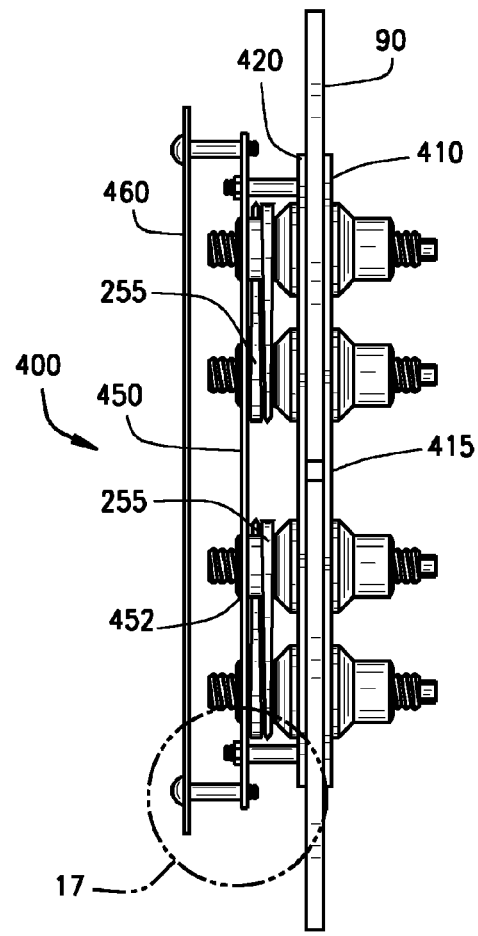
FIG. 16 shows a sectional view of the horizontal connection.
Figure 17:
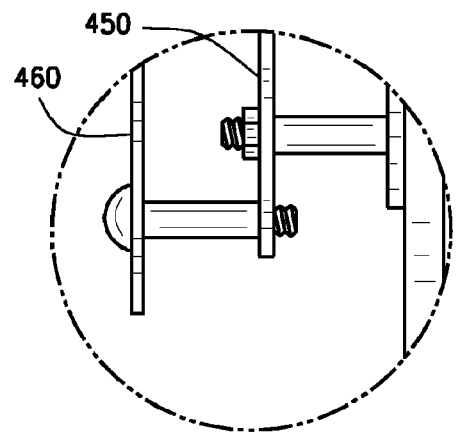
FIG. 17 shows a detailed view of the attachment of the cover plate to the horizontal connection.

A horizontal connection 400 will now be described. The horizontal connection 400 is shown in FIGS. 15-17. The horizontal connection 400 connects or secures a first section 90 to adjacent sections 90 above or below the first section 90. The horizontal connection 400 forms a slip critical or friction connection between the adjacent sections 90. Typically, a first lower section 90 is connected or secured to a second section 90 placed on top of the first lower section 90 before a third higher section 90 is placed on the second section 90. The plurality of the sections 90 build the height of the tower structure 100.

An interior friction plate 410 covers an interior side of a seam 415 between the adjacent sections 90, while an exterior friction plate 420 covers an exterior side of the seam 415 between the adjacent sections 90. Both the interior friction plate 410 and the exterior friction plates 420 have a curved shape to correspond to the curved surface of the section 90, which has the generally circular shape. The interior and exterior friction plates 410 and 420 are made of steel or other rigid metal or metal alloy.

The interior friction plate 410 and the exterior friction plate 420 include a first set 433 of a plurality of holes 435 and a second set 436 of a plurality of holes 437. For example, the first set 433 of the plurality of holes 435 are used to attach to an upper section 90, and the second set 436 of plurality holes 437 are used to connect to a lower section 90. A solid region 412 of the interior friction plate 410 covers the interior side of the seam 415. A solid region 422 of the exterior friction plate 420 covers the exterior side of the seam 415. The solid regions 412 and 422 separate the first set 433 of the plurality of holes 435 from the second set 436 of the plurality of holes 437.

The threaded studs 210 pass through holes 45 in the horizontal edges 60 of the panels 50. The first end 212 of the threaded stud 210 is on the interior side of the section 90 and the second end 214 of the threaded stud 210 is on the exterior side of the section 90. The first end 212 of the threaded stud 210 receives the flange nut 220 on the inside of the section 90 over the interior friction plate 410. A washer 428 may be employed between the flange nut 220 and the interior friction plate 410.

On the exterior side of the section 90, the second end 214 of the stud 210 is secured to an additional flange nut 220. The anti-rotation nut tabs 255 are placed over the flange nuts 220. Next, a stop plate 450 is placed over the flange nuts 220 to prevent the flange nuts 220 from falling away. The stop plate 450 comprises a plurality of openings 452 that fit over or engage the flange nuts 220. A cover plate 460 is attached to the stop plate 450 to provide protection to the horizontal connection number 400, as well as provide and more aesthetically pleasing appearance.

The vertical connections 200 and 201 and the horizontal connection 400 provide a slip critical or friction connection between the adjacent panels 50 and the adjacent sections 90. The pressing of the interior friction plate 231 and exterior friction plate 230 of the vertical connections 200 and 201 and the pressing of the interior friction plate 410 and the exterior friction plate 420 of the horizontal connection 400 transfer the load through the panels 50 and the sections 90. Essentially, when fully assembled the vertical connection 200 and the horizontal connection 400 result in a one-piece tower structure 100. The load of the tower structure 100 and a turbine is not transferred through the threaded studs 210. The load from the tower 100 and the turbine are transferred from the panels 50 of the upper sections 90 to the panels 50 of the lower sections 90 through the various frictions plates 230, 231, 410, and 420. This slip critical or friction connection results in greatly reduced fatigue on the individual components of the tower structure 100, as compared to the other convention tubular steel tower designs. The reduced fatigue characteristics resulting from these connections allows for a more efficient and therefore more economical use of material in the overall tower design.

Importantly, the threaded stud 210 utilizes two flange nuts 220 or one flange nut 220 on the exterior side and one heavy hex nut on the interior side. As such, as the flange nuts 220 or heavy hex nuts are tightened on the first and second ends 212 and 214 of the threaded stud 210, and little or no rotational force is loaded onto the threaded stud 210. The use of the two flange nuts 220 is an improvement over a conventional arrangement using a bolt and a single nut, since a rotational force or load is applied on the bolt that tends to want to relax to an untorqued state.

As described above, the panels 50 are provided in shipping bundles 55 to ease in loading, transportation, unloading, and assembly. The shipping bundles 55 are easily loaded and unloaded using a two-point lifting arrangement. The frame members 70 assist in the stacking of the panels 50 into the shipping bundles 55.

The frame members 70 also assist in the assembly of the panels 50 in the sections 90. The frame members 70 form an integral part of the field assembly jig 80, as the frame members 70 are connected to the ground support wings 110 and the upper support wings 120. Moreover, the frame members 70 are removed from the completed section 90 and returned to the factory or manufacturer for reuse on further panels 50.

Those skilled in the art will appreciate that variations from the specific embodiments disclosed above are contemplated by the invention. The invention should not be restricted to the above embodiments, but should be measured by the following claims.

What is claimed is:

1. A modular tower structure, comprising:
   a plurality of sections, the sections comprise a plurality of panels;
   the panels comprising a curved or arcuate shape, the panels comprising vertical edges and horizontal edges;
   a vertical connection to connect or secure the panels at the vertical edges of the panels and form the sections, wherein the sections have a generally circular shape;
   the vertical connection comprising an interior vertical friction plate positioned over a seam between adjacent panels and an exterior vertical friction plate positioned over the seam between the adjacent panels, nuts on an exterior side of the panels that receive threaded studs passing through holes in the interior vertical friction plate, the panel, and the exterior vertical friction plate, and the nuts of the vertical connection hold anti-rotation nut tabs;
   a horizontal connection to connect or secure the sections at the horizontal edges of the panels; and
   the horizontal connection comprising an interior friction plate that covers a seam between the adjacent sections, and an exterior friction plate that covers the seam between the adjacent sections, and nuts on an exterior side of the panels that receive threaded studs passing through holes in the interior horizontal friction plate, the panels, and the exterior horizontal friction plate; and the nuts of the horizontal connection hold anti-rotation nut tabs.

2. The modular tower structure according to claim 1, wherein the vertical connection forms a slip critical or friction connection between the adjacent panels, and the horizontal connection forms a slip critical or friction connection between the adjacent sections.

3. The modular tower structure according to claim 1, wherein the plurality of sections are stacked on each other and the adjacent sections are connected or secured together by the horizontal connection.

4. The modular tower structure according to claim 1, wherein the panels comprise a plurality of the holes bored therethrough along the vertical edges of the panels.

5. The modular tower structure according to claim 4, wherein the threaded stud passes through the holes such that a first end of the threaded stud is on an interior side of the panel and a second end of the threaded stud is on the exterior side of the panel.

6. The modular tower structure according to claim 5, wherein the interior and exterior vertical friction plates comprise a plurality of the holes corresponding to the holes in the panel and are installed on the threaded studs on both the interior and the exterior sides of the panel.

7. The modular tower structure according to claim 6, wherein a flange nut on the exterior side of the panel receives the stud.

8. The modular tower structure according to claim 7, wherein the anti-rotation nut tab is placed over the flange nut on the exterior side of the panel, and the anti-rotation nut tab prevents the tightened flange nut from loosening as an extending end of the anti-rotation nut tab contacts an adjacent flange nut.

9. The modular tower structure according to claim 8, wherein a bottom surface of the anti-rotation nut tab is supported against a top surface of the tray plate.

10. The modular tower structure according to claim 7, wherein the flange nut is provided with a groove that receives a snap ring, and the snap ring comprises a plastic washer or other snap fitting that urges or holds the anti-rotation nut tab onto the flange nut.

11. The modular tower structure according to claim 5, wherein the interior and exterior vertical friction plates have a plurality of the holes that receive the threaded studs, and the plurality of the holes in the interior and exterior friction plates are oppositely disposed such that a first set of the oppositely disposed holes are used to connect to a first panel and a second set of the oppositely disposed holes are used to connect to a second panel, wherein the first set of the holes in the interior and exterior vertical friction plates correspond to the holes in the vertical edges of the first panel and the second set of the holes in the interior and exterior vertical friction plates correspond to the holes in the vertical edge of the second panel.

12. The modular tower structure according to claim 11, wherein the first set of holes in the interior and exterior vertical friction plates forms a column of holes opposite a column of holes of the second set of holes.

13. The modular tower structure according to claim 5, wherein on the exterior side of the panels, a support plate is placed over the threaded studs, a tray plate is placed over the threaded studs and the support plate, and the tray plate is secured to the support plate.

14. The modular tower structure according to claim 1, wherein the interior and exterior vertical friction plates are linear members comprising two oppositely disposed sets of the holes.

15. The modular tower structure according to claim 1, wherein the vertical connection comprises a stop plate comprising a plurality of openings that fit over or engage the nuts and the anti-rotation nut tabs on the exterior side of the panel.

16. The modular tower structure according to claim 15, wherein the stop plate secures the nuts from rotating, and a cover plate is attached to the stop plate.

17. The modular tower structure according to claim 1, wherein the modular tower structure has a height of approximately 80 meters or greater.

18. The modular tower structure according to claim 1, wherein the horizontal connection connects or secures a first section adjacent to sections above or below the first section.

19. The modular tower structure according to claim 1, wherein the interior friction plate and the exterior friction plates of the horizontal connection have a curved shape to correspond to curved surfaces of the sections.

20. The modular tower structure according to claim 19, wherein the interior friction plate and the exterior friction plate of the horizontal connection include a first set of a plurality of the holes and a second set of a plurality of the holes, and the first set of the plurality of the holes connect to an upper section, and the second set of the plurality holes connect to a lower section.

21. The modular tower structure according to claim 1, wherein the threaded studs pass through the holes in the horizontal edges of the panels, and a first end of the threaded stud is on the interior side of the section and a second end of the threaded stud is on the exterior side of the section, and a flange nut receives the second end of the threaded stud on the exterior side of section.

22. The modular tower structure according to claim 21, wherein an anti-rotation nut tab is placed over the flange nut, and a stop plate comprising a plurality of openings is placed over the flange nut and the anti-rotation nut tabs.

23. The modular tower structure according to claim 22, wherein a cover plate is attached to the stop plate.

24. The modular tower structure according to claim 1, wherein frame members are attached to an exterior surface of the panels.

25. The modular tower structure according to claim 1, further comprising a wind turbine.

26. A modular tower structure, comprising:
a plurality of sections, wherein one or more of the sections of the plurality of sections comprises a plurality of panels;
the panels comprising a curved or arcuate shape, the panels comprising vertical edges, a top edge, and a bottom edge;
a vertical connection forming a slip critical or friction connection to connect or secure the panels at the vertical edges of adjacent panels and form the sections, wherein the sections have a generally circular shape, wherein the vertical connection comprises interior and exterior vertical friction plates to cover a seam between the adjacent panels, nuts on an exterior side of the panels receive threaded studs passing through holes in the interior vertical friction plate, the panel, and the exterior vertical friction plate, and the nuts of the vertical connection hold anti-rotation nut tabs;
the sections comprising a bottom horizontal edge formed from the bottom edges of the panels, and the sections comprising a top horizontal edge formed from the top edges of the panels; and
a horizontal connection forming a slip critical or friction connection to connect or secure the top horizontal edge of a first section to a bottom horizontal edge of a second section, wherein the horizontal connection comprises interior and exterior horizontal friction plates to cover a seam between the first section and the second section, nuts on an exterior side of the panels receive threaded studs passing through holes in the interior horizontal friction plate, the panel, and the exterior horizontal friction plate, and the nuts of the horizontal connection hold anti-rotation nut tabs.

27. A modular tower structure, comprising:
a plurality of sections, wherein one or more of the sections of the plurality of sections comprises a plurality of panels;
the panels comprising a curved or arcuate shape, the panels comprising vertical edges and horizontal edges;
a vertical connection to connect or secure the panels to form the sections, wherein the sections have a generally circular shape;
a horizontal connection to connect or secure the sections; and
the horizontal connection comprising an interior friction plate that covers a seam between the adjacent sections, an exterior friction plate that covers the seam between the adjacent sections, wherein the interior and exterior friction plates are curved to cover the seam, and flange nuts that receive threaded studs passing through openings in the interior friction plate, the panels, and the exterior friction plate, wherein the flange nuts hold anti-rotation nut tabs.

28. A modular tower structure, comprising:
a plurality of sections, wherein one or more of the sections of the plurality of sections comprises a plurality of panels;
the panels comprising a curved or arcuate shape;

a vertical connection to connect or secure the panels to form the sections, wherein the sections have a generally circular shape;
the vertical connection comprising an interior vertical friction plate positioned over a seam between adjacent panels and an exterior vertical friction plate positioned over the seam between adjacent panels, the vertical connection extending the length of the seam;
flange nuts on the exterior side of the panels that receive threaded studs passing through openings in the interior vertical friction plate, the panel, and the exterior vertical friction plate, wherein the flange nuts hold anti-rotation nut tabs; and
a horizontal connection to connect or secure the sections together.

29. A connection for securing or connecting panels together for a modular tower structure, the connection comprising:
an interior vertical friction plate;
an exterior vertical friction plate;
a tray plate or a stop plate, the tray plate or the stop plate comprising a plurality of openings that fit over or engage flange nuts;
each of the vertical friction plates having a plurality of holes, and the plurality of holes are oppositely disposed;
threaded studs that pass through the holes in the interior friction plate, the holes in the exterior friction plate, and the openings in the tray or stop plate, wherein the threaded studs have a first threaded end and a second threaded end;
the flange nuts of the tray or the stop plate receive the second threaded end of the threaded studs;
additional nuts receive the first threaded end; and
the flange nuts hold anti-rotation nut tabs.

30. The connection according to claim 29, wherein the connection is configured to be tightened from inside of the modular tower.

31. The connection according to claim 29, wherein the interior vertical friction plate is positioned over a seam between adjacent panels and the exterior vertical friction plate is positioned over the seam between adjacent panels, and the plurality of holes of the vertical friction plates are oppositely disposed such that a first set of the oppositely disposed holes are used to connect to a first panel and a second set of the oppositely disposed holes are used to connect to a second panel, wherein the first set of holes in the vertical friction plate corresponds to holes in the vertical edge of a first panel and the second set of holes in the vertical friction plate corresponds to holes in the vertical edge of a second panel.

32. A connection for securing or connecting sections together for a modular tower structure, the connection comprising:
an interior friction plate;
an exterior friction plate;
the interior friction plate and the exterior friction plate comprising a first set of a plurality of holes and a second set of a plurality of holes;
a stop plate comprising a plurality of openings;
threaded studs having a first threaded end and a second threaded end that pass through the first set of holes in the interior friction plate, the first set of holes in the exterior friction plate, the plurality of openings in the stop plate, and into flange nuts engaged by the plurality of openings in the stop plate; and
additional threaded studs having a first threaded end and a second threaded end that pass through the second set of holes in the interior friction plate, the second set of holes in the exterior friction plate, the plurality of openings in the stop plate, and into additional flange nuts engaged by the plurality of openings in the stop plate.

33. The connection according to claim 32, wherein the interior friction plate covers a seam between adjacent sections, wherein the adjacent sections include sections in a stacked arrangement, the exterior friction plate covers the seam between the adjacent sections;
the first set of the plurality of holes correspond to openings in an upper section, and the second set of the plurality holes correspond to openings in a lower section; and
the threaded studs pass through the first set of holes and into the openings in the upper section; and the additional threaded studs pass through the second set of holes and into openings in the lower section.

34. The connection according to claim 32, wherein the connection is configured to be tightened from an inside of the modular tower.

35. A method of assembling a modular tower structure, comprising:
connecting a frame member to each of a plurality of panels;
stacking the panels using the frame member;
transporting the plurality of panels to an assembly site;
aligning a vertical edge of one of the plurality of panels with another vertical edge of another panel of the plurality of panels;
connecting or securing a vertical connection between the vertical edges of the panels;
forming a first section from the panels, the first section having a generally circular shape;
forming the first section in a jig assembly using the frame members in the jig assembly;
forming a second section from the panels, the second section having a general circular shape;
stacking the second section on the first section; and
connecting or securing a horizontal connection between first and second sections to form a modular tower.

36. The method of assembling the modular tower structure according to claim 35, further comprising connecting the frame members of the panels to ground support wings of the jig assembly during the forming of the first section.

37. The method of assembling the modular tower structure according to claim 36, further comprising connecting upper support wings to the frame members.

38. The method of assembling the modular tower structure according to claim 37, further comprising removing the frame members from the panels after the section of panels is formed.

39. A method of assembling a modular tower structure, comprising:
forming a bundle of two or more panels, wherein the panels comprise frame members;
transporting the bundle to an assembly site;
removing one of the panels from the bundle;
placing one of the panels next to another panel;
forming an assembly jig partially from the frame members of the panels;
forming a first section from the panels in the assembly jig; the first section having a generally circular shape;
removing the frame members;
forming a second section from the panels, the second section having a general circular shape;
stacking the second section on the first section; and
connecting or securing the first and second sections together to form a modular tower.

40. A modular tower structure, comprising:
a plurality of sections, wherein one or more of the sections of the plurality of sections comprises a plurality of panels;
the panels comprising a curved or arcuate shape, the panels comprising vertical edges and horizontal edges;
a vertical connection to connect or secure the panels to form the sections, wherein the sections have a generally circular shape;
a horizontal connection to connect or secure the sections; and
the horizontal connection comprising an interior friction plate that covers a seam between the adjacent sections, an exterior friction plate that covers the seam between the adjacent sections, and nuts that receive threaded studs passing through openings in the interior friction plate, the panels, and the exterior friction plate, wherein the nuts hold anti-rotation nut tabs, wherein the anti-rotation nut tabs comprise an opening to attachingly engage the nut and an extending end to contact an adjacent nut.

41. A modular tower structure, comprising:
a plurality of sections, wherein one or more of the sections of the plurality of sections comprises a plurality of panels;
the panels comprising a curved or arcuate shape;
a vertical connection to connect or secure the panels to form the sections, wherein the sections have a generally circular shape;
the vertical connection comprising an interior vertical friction plate positioned over a seam between adjacent panels and an exterior vertical friction plate positioned over the seam between adjacent panels;
nuts on the exterior side of the panels that receive threaded studs passing through openings in the interior vertical friction plate, the panel, and the exterior vertical friction plate, wherein the nuts hold anti-rotation nut tabs, wherein the anti-rotation nut tabs comprise an opening to attachingly engage the nut and an extending end to contact an adjacent nut; and
a horizontal connection to connect or secure the sections together.

* * * * *